United States Patent Office 3,119,203
Patented Jan. 28, 1964

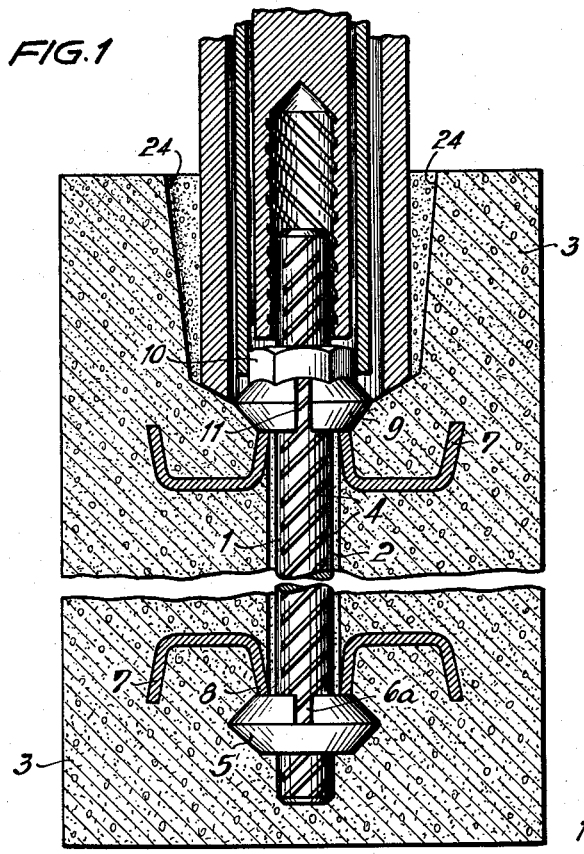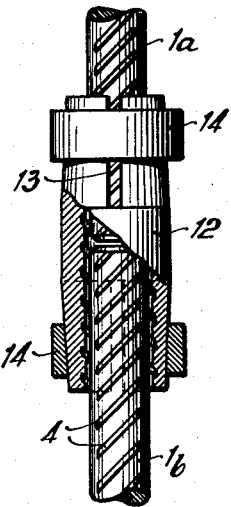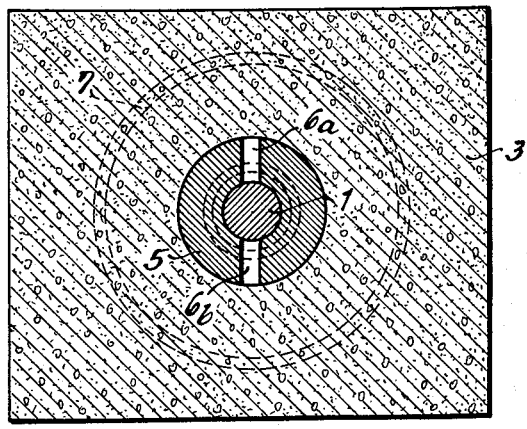

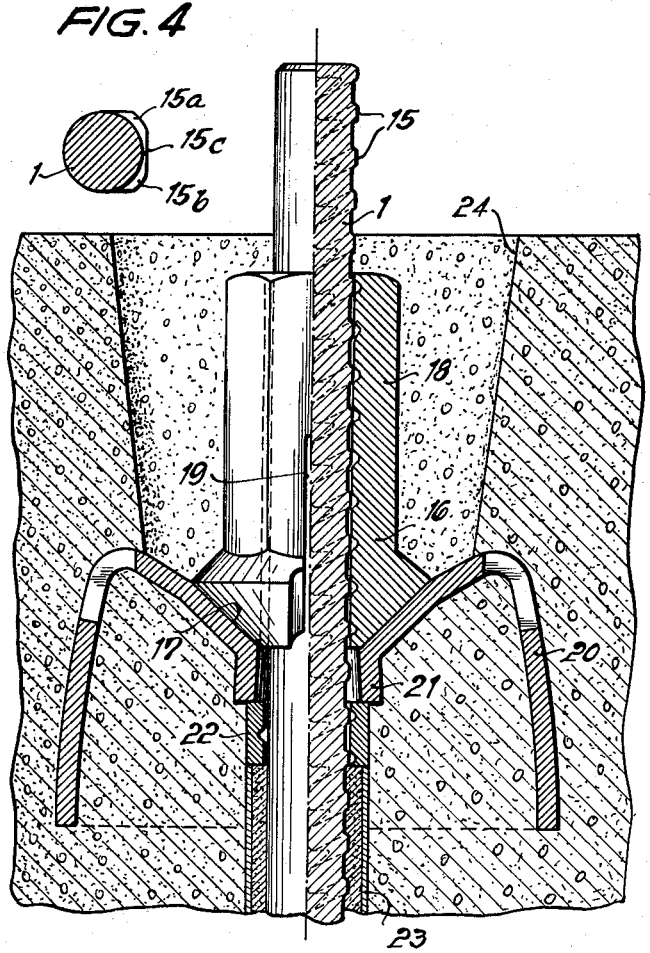

3,119,203
ANCHORING MEANS FOR REINFORCING
INSERTS IN CONCRETE
Ulrich Finsterwalder, Munich-Obermenzing, Germany, assignor to Dyckerhoff & Widmann Kommanditgesellschaft, Munich, Germany
Filed Apr. 4, 1957, Ser. No. 650,761
Claims priority, application Germany Apr. 12, 1956
1 Claim. (Cl. 50—128)

The present invention relates to anchoring means for the reinforcement inserts in concrete, particularly for concrete spans such as beams or the like.

It was already known heretofore for anchoring reinforcing rods in concrete to roll threads upon the ends of the steel rods and to screw onto these threads anchoring nuts with intermediately placed anchor plates.

The use of normally cut threads causes weakening of the threaded end portions due to decrease of the cross-section by the thread cutting so that the advantage of the carrying capacity of the full cross-section of the rod is not obtained. While cold rolled threads avoid this shortcoming they result in excessive wear on the cutting tools because high grade steel must be used. Also in both cases the tension rods must first be cut to length before the threads can be cut.

In accordance with the invention these shortcomings are overcome in that reinforcement rods of any desired cross-section are provided throughout their entire length or along predetermined sections, primarily at their ends, with threads defined by helically disposed projecting conformations which are placed only around a portion of the circumference of the reinforcement rod. An anchoring or socket member of any desired type having corresponding threads is mounted upon the thread thus formed.

It is sufficient in many instances to provide the said projections which are aligned in the manner of threads only over one-quarter or one-third of the circumference of the steel rod.

Especially good results have been obtained where the said projections extend over half of the circumference of the steel rod and if the projections of each threaded portion have full thickness or height only at the beginning and at the end thereof while, on the other hand, the said thread portions are flattened out intermediate the beginning and the end.

The projections, which in combination constitute a continuous thread, can be provided either throughout the entire length of the span rod or only along the end zones of the steel rod which is to be anchored. It is also possible to provide the projections sectionally in that zones of predetermined length provided with projections alternate with zones having no projections.

The production of the projections can be effected in different ways. Preferably the projections are produced by rolling, because thus the forming can take place at the same time as the rolling of the steel rod. In order to facilitate the rolling of the thread-like projections the upper roller or the lower roller can be provided with suitable grooving, for example, in the form of recesses which constitute a negative of the projections to be produced upon the rod.

It is also possible to provide the projecting conformations which form a substantially continuous thread by means of a pressing operation.

It is, therefore, an object of the invention to construct such reinforcing means in a simpler and more effective manner and such that the reinforcement inserts may be of any desired cross-section.

It is a further object of the invention to construct an anchoring member which provides additional advantages in combination with the anchoring members used in accordance with the invention.

The anchoring member which is in threaded engagement with the rod is of annular conformation, and it is provided along that side where the pressure is applied, and if desired also on the opposite side, with a frusto-conical plane which is inclined at an angle of 30° to 60°, preferably 45°, with respect to the axis of the steel rod. In this manner the forces which are introduced during the stretching of the steel rods are distributed substantially radially to the sides, to be absorbed there by a reinforcement basket or by a shell shaped portion of the anchoring body.

It is advisable to use an anchoring body at the end where the tension forces are applied to the steel rod (tensioning side), of a type which has a frusto-conical surface only along the side where the pressure is effective, while it is provided on the opposite side with a hexagonal head for engagement by a socket wrench for tightening the anchoring body after tension has been applied to the anchoring rod.

Further objects of the invention and details and advantages obtained thereby will appear from the following description of several embodiments illustrated in the attached drawings wherein:

FIG. 1 is a longitudinal section through a first embodiment of the anchoring means, FIG. 2 is a plan view of the anchoring means in accordance with FIG. 1, FIG. 3 is a longitudinal section taken through the different embodiment of the anchoring means, FIG. 4 is a cross-section through a steel rod in accordance with FIG. 3, and FIG. 5 illustrates in partial sectional view the connection of two steel rods with one another by means of a sleeve.

In FIG. 1 which is a cross-section along the anchoring end and the tensioning end of a span or tension rod, the rod 1 is disposed for lengthwise movement in a tubular sleeve 2 of the concrete body 3 and is provided throughout its length with projections 4 which extend in the form of a spiral. The projections are preferably made at the time the rod is rolled and due to the conditions imposed by the rolling operation they do not extend around the entire circumference of the rod but only around a part thereof.

A blocking member 5 is threaded onto the tensioning rod which is constituted of an annular member of triangular cross-section having internal threads corresponding to the projections 4 and outer surfaces which are inclined substantially at angles of 45° with respect to the axis of the rod. The blocking or anchoring member is also provided with oppositely disposed slots 6a and 6b to provide for a certain amount of resiliency and firm engagement with the rod. One of these slots does not extend the full length of the block to hold the two portions together in the form of a unit. An annular shell is provided to absorb the lateral or transverse strains developed by the block 5. This shell faces outwardly with its concave end and the block 5 is supported against the inner edge 8 of shell 7.

An anchoring member 9 is also provided at the tensioning side of this steel rod which member is provided with a hexagonal head 10, which serves for tightening the anchoring body 9 after the required prestressing forces have been applied to the steel rod in the usual manner, for example by means of a hydraulic press.

The anchoring member 9 is also provided with two oppositely disposed slots 11 which provide for a certain amount of yielding and afford rigid pressing of the locking member upon the steel rod. These slots 11 serve the additional purpose of apertures through which the space between the rod 4 and sleeve 2 can be filled with mortar or cement. Furthermore, an annular shell 7 is placed over the steel rod to absorb lateral shearing forces. A recess 24 is provided in the concrete body circumferentially of the tension rod end which has a conical surface which is inclined in the direction of the axis of the tension rod for applying a hydraulic press for the purpose of holding down the outward pressures which result from tightening.

In the embodiment in accordance with FIG. 3 the projections 15 extend approximately over one-half the circumference of the steel rod. Only at the beginning 15a and the end 15b they possess full thickness, while in the central zone 15c they are flattened (FIG. 4) owing to conditions imposed by the rolling operation.

The annular anchoring member 16 is also provided with a frusto-conical surface 17 at the side where the force is applied which is inclined about 45° with respect to the axis of the rod, in a manner similar to the embodiment in accordance with FIGS. 1 and 2. At the opposite side the anchoring body is likewise provided with a hexagonal head 18.

The anchoring member in accordance with this embodiment is also provided with two oppositely disposed slots 19 one of which is expanded to provide a space through which the cement can be forced into the space between the tubular sleeve 23 and rod 1. An annular shell 20 is placed over the tension rod in the region of anchoring to absorb the shearing forces, the concave side of which faces the interior of the building element. The inner edge 21 of the shell rests against a sleeve portion 22 which is screwed onto the tension rod and which closes the sleeve 23 and provides for accurate alignment. The threads of this sleeve which is of relatively soft material are sheared off automatically during the tightening as the rod stretches. The bottom of the shell is inclined with respect to the axis of the tension rod and constitutes the abutment for the anchoring body and for the press for tensioning the steel rod.

In larger structures the tension rods must be placed end to end. For faultless connecting of two tension rods 1a and 1b (FIG. 5) sleeves 12 are provided, each of which has two oppositely disposed slots 13 at the end thereof and which are slightly tapered to permit the application of self-locking rings 14.

Having now described my invention with reference to the embodiments illustrated in the drawings, I do not wish to be limited thereto but what I desire to protect by Letters Patent of the United States is set forth in the appended claim.

I claim:

Anchoring means for reinforcing rods for concrete, particularly for spans or beams, said means comprising a reinforcing rod provided along predetermined portions thereof with projecting anchoring ribs extending in a helical pattern around spaced areas on one side of said rod to form an interrupted thread, the other side of said rod presenting an unobstructed surface, an annular shell embedded in the reinforced concrete having a portion defining an annular space around said rod and a cooperating anchoring member having internal thread conformations corresponding to said ribs mounted on said rod and having an abutment surface in engagement with a portion of said shell, said projecting ribs being provided upon said rod in areas covering in excess of one-fourth of the circumference of the ribbed rod portion, said ribs defining said ribbed portions being provided on said rod in a manner that ribbed portions alternate longitudinally of said rod with non-ribbed portions, and said cooperating member being provided on at least that side which absorbs the tension forces with a conical surface inclined at an angle with respect to the axis of the rod and having two slots on opposite sides thereof including one extending only over a part of the length of said member disposed in communicating relation with said annular space around said rod.

References Cited in the file of this patent

UNITED STATES PATENTS

| | | |
|---|---|---|
| 694,576 | Ransome | Mar. 4, 1902 |
| 943,469 | Schade | Dec. 14, 1909 |
| 1,152,606 | Collings | Sept. 7, 1915 |
| 1,629,058 | Wilson | May 17, 1927 |
| 1,671,458 | Wilson | May 29, 1928 |
| 2,371,882 | Freyssinet | Mar. 20, 1945 |
| 2,424,037 | Jenkins | July 15, 1947 |
| 2,677,956 | Schorer | May 11, 1954 |
| 2,755,657 | Finsterwalder | July 24, 1956 |
| 2,897,570 | Carper | Aug. 4, 1959 |

FOREIGN PATENTS

| | | |
|---|---|---|
| 855,901 | Germany | Nov. 17, 1952 |